E. I. DODDS.
STAY BOLT.
APPLICATION FILED SEPT. 21, 1912.
1,079,224.
Patented Nov. 18, 1913.
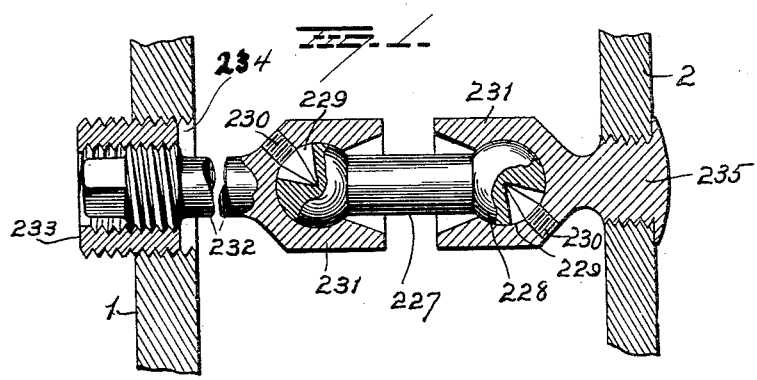
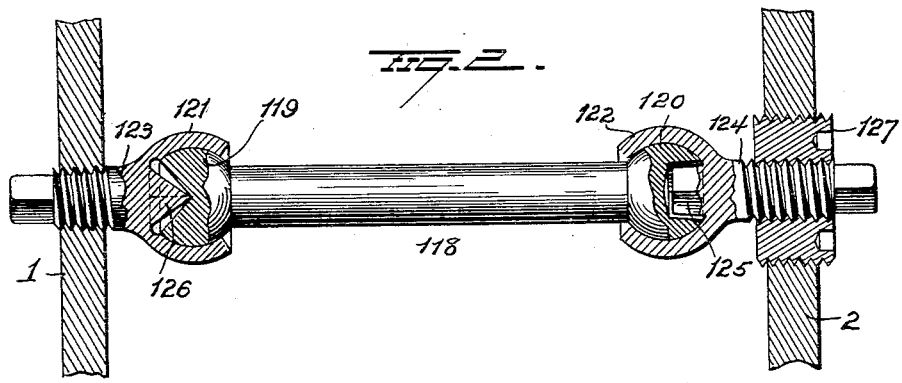
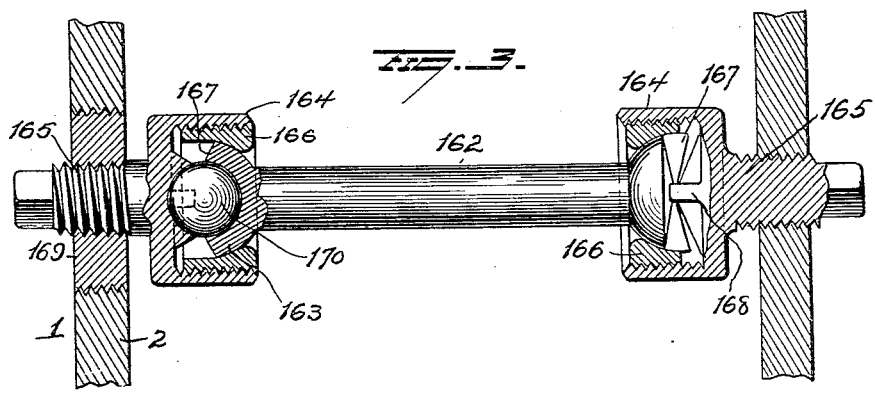
WITNESSES
E. D. Nottingham
G. F. Downing
INVENTOR
E. I. Dodds
K. A. Seymour
Attorney

UNITED STATES PATENT OFFICE.

ETHAN I. DODDS, OF CENTRAL VALLEY, NEW YORK, ASSIGNOR, BY MESNE ASSIGNMENTS, TO FLANNERY BOLT COMPANY, OF PITTSBURGH, PENNSYLVANIA.

STAY-BOLT.

1,079,224.     Specification of Letters Patent.     Patented Nov. 18, 1913.

Original application filed September 25, 1911, Serial No. 651,051. Divided and this application filed September 21, 1912. Serial No. 721,679.

*To all whom it may concern:*

Be it known that I, ETHAN I. DODDS, a citizen of the United States, residing at Central Valley, in the county of Orange and State of New York, have invented certain new and useful Improvements in Stay-Bolts; and I do hereby declare the following to be a full, clear, and exact description of the invention, such as will enable others skilled in the art to which it appertains to make and use the same.

This invention relates to flexible couplings such as are employed for connecting the outside and inside plates of locomotive and other boilers and is a division of application Serial Number 651,051, filed September 25th, 1911.

The object of this invention is to provide a coupling which will permit of a great range of angular movement of each of the connected parts, but which will prevent complete rotation of any one of the parts independently of the other, thereby permitting the connected parts of the coupling to be readily applied from one side without dismantling the engine, and it consists in the parts and combinations of parts as will be more fully explained and pointed out in the claims.

In the accompanying drawings, Figure 1 is a view partly in section and partly in elevation of one form of my invention and Figs. 2 and 3 are similar views of modified forms.

1 represents the inside plate of a locomotive boiler and 2 the outside plate.

In each construction herein shown the bolt shank is provided at its opposite ends with heads formed in the arc of a circle and seated within recessed connectors secured to the plates 1 and 2.

In the construction shown in Fig. 1 the bolt shank 227 has a ball head 228 at each end. Each ball head is provided with a conical socket 229, the apices of which are at the centers of the heads. These heads are mounted in similarly shaped sockets in the connectors 231, and in the present instance are secured therein by upsetting or swaging the walls of the sockets down around the heads. Instead however of thus permanently securing the parts together, they may be detachably connected by threading the inner walls of the sockets, and employing washers similar to the washers 166 of Fig. 3, the washers being provided with curved seats against which the rounded heads of the bolt shank rests and bears. Secured to the connectors 231 are the keys 230. These keys rest within the conical recesses 229 in the heads of the bolt, and bear at their free ends against the inner ends of said recesses, the said recesses being to one side of the long axis of the bolt, so that as the bolt is turned, the side walls of the recess will make contact with the keys and turn or rotate the connectors. Each key is conical in shape and considerably smaller in diameter than the diameter of its recess, so as to provide for ample angular or universal movement between the parts, and each is secured rigidly to its connector. In the present instance they are shown screwed into the connectors, but other means of rigid connection between the key and its connector may be employed. One of the connectors is shown threaded into plate or wall 2, and upset as at 235 at its free end, and the other shank 232 threaded into a bushing 233, which is in turn secured within the threaded opening 234 in the plate or wall 1. With this construction the entire bolt, assembled may be entered through opening 234 and secured to the plates, after which the outer end is riveted down as previously explained. With this construction, while the keys permit of ample angular movement between the parts they prevent complete rotation of any one part, without imparting a movement to the other parts.

In Fig. 2, the bolt shank 118 is formed with solid spherical heads 119, 120, which latter are embraced by the hollow inwardly swaged inner ends 121 and 122 respectively of the connectors 123 and 124 which latter are secured to the plates or walls 1 and 2. The outer ends of the heads 119—120 are socketed to receive inwardly projecting integral angular studs 126, 125, formed at the base of the sockets in the members 121 and 122, the engagement of these studs with the sockets being such as to permit their necessary angular adjustment and to effect a rotary driving movement between the connected parts, so as to permit the introduction of the assembled device through a hole in the wall 2, and the screwing of its forward end into the wall 1. The hole in the wall 2 is closed by a bushing 127, threaded to receive the shank of connector 124.

In Fig. 3, the shank 162 is provided with rounded heads 163 resting within socketed ends of the connectors 165, and confined therein by washers 166 formed with concave seats to engage the heads 163. The meeting faces of the bolt heads and connectors are formed with radial tapered teeth 167 and 168 respectively, that permit a sufficient degree of universal angular movement, and at the same time connect the parts for rotary movement. Connector 165 is threaded into a bushing 169. The hole for this bushing is of a size sufficient to permit the parts to be introduced through plate or wall 2 and screwed into the opposite plate. At the left hand end of bolt 162 I have shown the central portions of the meeting faces of the bolt head and connectors as hollowed out to receive a ball 170 on which the parts can rock. At the opposite end, the meeting faces are conical and engage at the apices of the cones.

It is evident that many slight changes might be resorted to in the relative arrangement of parts shown and described without departing from the spirit and scope of my invention as set forth in the claims annexed. Hence I would have it understood that I do not wish to confine myself to the exact construction and arrangement of parts shown and described, but, Having fully described my invention what I claim as new and desire to secure by Letters-Patent, is:—

1. The combination of a bolt having rounded heads at its opposite ends, connectors having sockets shaped to receive said heads, and one connector also having reduced threaded end, an externally threaded bushing adapted for attachment to a wall of the furnace and provided with a threaded opening to receive the reduced threaded end of said connector, whereby the bolt may be passed through the opening for the bushing and then secured in place by the bushing, and interlocking projections on the heads and connectors whereby the parts have free universal angular movement, but are restrained against independent rotary movement.

2. The combination of a bolt having heads each having a rounded bearing surface, connectors having sockets with curved seats for said heads, one of said connectors also provided with a reduced threaded end, an externally threaded bushing adapted for attachment to a wall of the furnace and provided with a threaded opening to receive the reduced threaded end of said connector, whereby the bolt may be passed through the opening for the bushing and then secured in place by the bushing and projections fixed to both connectors and resting within recesses in the heads of the bolts, the said projections and recesses being so shaped and of such relative size as to permit free angular movements of one part independently of the other, but which will prevent a complete rotation of one part independently of the other.

3. The combination of a member having a ball shaped head, a recess in said head to one side of the long axis of the member, a second member having a socket with a curved seat for the head and a key carried by said second member and resting in the recess in the ball shaped head.

4. The combination of a member having a spherical head the latter provided with a conical recess located to one side of the long axis of said member, a second member having a socket to receive the spherical head and with a curved seat for the latter, and a conical key carried by said second member and resting within the recess in the spherical head.

5. The combination with a bolt having a rounded head at each end, connectors having sockets shaped to receive said heads, one of said connectors having a reduced end, and an externally threaded bushing adapted for attachment to the wall of a furnace, and provided with a threaded opening to receive the reduced threaded end of the connector, whereby the bolt may be passed through the opening for the bushing and then secured in place by the bushing.

In testimony whereof, I have signed this specification in the presence of two subscribing witnesses.

ETHAN I. DODDS.

Witnesses:
A. W. BRIGHT,
GEO. F. DOWNING.

---

Copies of this patent may be obtained for five cents each, by addressing the "Commissioner of Patents, Washington, D. C."